United States Patent
Bender et al.

(10) Patent No.: US 7,332,090 B2
(45) Date of Patent: Feb. 19, 2008

(54) PROCESS FOR THE REMOVAL OF MERCURY FROM SOLUTIONS CONTAMINATED WITH MERCURY

(75) Inventors: Hans-Jürgen Bender, Freinsheim (DE); Holger Friedrich, Bobenheim-Roxheim (DE); Josef Guth, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/535,969

(22) PCT Filed: Nov. 17, 2003

(86) PCT No.: PCT/EP03/12817

§ 371 (c)(1),
(2), (4) Date: May 24, 2005

(87) PCT Pub. No.: WO2004/048624

PCT Pub. Date: Jun. 10, 2004

(65) Prior Publication Data

US 2006/0049109 A1    Mar. 9, 2006

(30) Foreign Application Priority Data

Nov. 26, 2002  (DE) .................. 102 55 240

(51) Int. Cl.
*C02F 1/42* (2006.01)
(52) U.S. Cl. ................ 210/688; 210/914
(58) Field of Classification Search ........... 210/688, 210/914
See application file for complete search history.

(56) References Cited

U.S. PATENT DOCUMENTS

| 3,502,434 | A | * | 3/1970 | MacMillan | 423/180 |
| 3,600,285 | A | | 8/1971 | Botwick et al. | 423/180 |
| 3,897,331 | A | * | 7/1975 | Smith et al. | 209/10 |
| 4,030,912 | A | | 6/1977 | Bukowick | 504/302 |
| 4,093,541 | A | | 6/1978 | Piccini et al. | 210/688 |
| 5,080,799 | A | | 1/1992 | Yan | 210/661 |
| 5,164,091 | A | | 11/1992 | Huber et al. | 210/638 |
| 5,962,365 | A | | 10/1999 | Langer et al. | 502/180 |
| 6,156,214 | A | | 12/2000 | Bongen et al. | 210/679 |
| 2003/0180597 | A1 | * | 9/2003 | Sakamoto et al. | 429/34 |

FOREIGN PATENT DOCUMENTS

| DE | 2051725 A | 4/1971 |
| DE | 2643478 A | 4/1977 |
| DE | 3335127 A | 4/1985 |
| DE | 221968 A | 5/1985 |
| DE | 3438098 A | 4/1986 |
| DE | 4116890 A | 11/1997 |
| DE | 19704889 A | 8/1998 |
| EP | 0479052 A | 4/1992 |
| JP | 58128182 | 7/1983 |

OTHER PUBLICATIONS

Isfort, Chemie Anlagen und Verfahren (CAV), Sep. 1972, pp. 65-69.
Chemie-Ing.-Techn., vol. 45, No. 4, Feb. 1972, pp. 217-219, XP009026443.

* cited by examiner

*Primary Examiner*—Chester T. Barry
(74) *Attorney, Agent, or Firm*—Connolly Bove Lodge & Hutz, LLP

(57) ABSTRACT

Mercury is removed from solutions contaminated with mercury by filtration through a carbon filter consisting of electrode graphite.

8 Claims, No Drawings

PROCESS FOR THE REMOVAL OF MERCURY FROM SOLUTIONS CONTAMINATED WITH MERCURY

The present invention relates to a process for the removal of mercury from liquids. In particular, the invention relates to a process for the removal of mercury from solutions, especially a process for the removal of mercury from the solutions, especially aqueous alkali metal hydroxide solution or alcoholic alkali metal alkoxide solution, formed in the decomposition of alkali metal amalgam by water or alcohols.

In some chemical processes, liquids containing mercury are obtained. On account of its toxicity, mercury is usually an undesirable impurity and must therefore usually be removed. For example, in alkali metal chloride electrolysis by the amalgam process chlorine and an alkali metal amalgam are produced. This alkali metal amalgam is decomposed with addition of water or alcohol to obtain the products alkali metal hydroxide or alkali metal alkoxide, which are important and prepared in large amounts, the mercury being released again and fed back into the electrolysis. The aqueous solution of alkali metal hydroxide produced in the decomposition of the amalgam (usually described as "alkali solution", especially described as "caustic soda solution", an aqueous sodium hydroxide solution and "caustic potash solution", an aqueous potassium hydroxide solution) or alcoholic solution of alkali metal alkoxide contains mercury, however, always in small amounts, typically in a range from 10 to 50 ppm ("parts per million", i.e. milligrams per kilogram. In the context of this invention, the data represent ppm or ppb, "parts per billion", i.e. micrograms per kilogram, always mass ratios). Under certain circumstances, this mercury content can also reach values above 100 ppm. This amount of mercury is not tolerable for most applications of alkali metal hydroxides or alkali metal alkoxides and must be lowered by a process for the removal of mercury ("demercurization"). Values of at most a few ppb are desired here, ideally at most 3 ppb, the mercury content is thus to be lowered by a factor of approximately $10^4$.

The mercury is usually present at least partly in the form of mercury metal, which is usually dispersed in the liquid in the form of very fine droplets or—below the solubility limit—dissolved.

Various processes for the removal of mercury from product streams are already known, also in connection with alkali metal amalgam cleavage. Often, a filtration through a carbon layer is used for this, which industrially is usually designed as filtration through a carbon layer and from the principle of action is an adsorption of mercury on carbon. Using an individual carbon filtration step, the required mercury depletion usually cannot be achieved. The filtration through a carbon layer is therefore usually one of a number of steps of an overall process for the depletion of mercury to the desired final value. Using a carbon filtration step, the mercury content can typically be lowered by a factor in the order of magnitude of 10. Further known process steps for the depletion of mercury are, for example, coalescence filtration, concentration, i.e. the evaporation of the solvent, or filtration through inorganic fiber material.

DE 20 51 725 A1 describes a process for the removal of mercury chlorides from the alkali metal chloride brine present in an alkali metal chloride electrolysis cell by adsorption on activated carbon. DE 34 38 098 A1 discloses a process for activated carbon filtration of mercury-containing solutions, in which the solution is led through an activated carbon filter against the force of gravity. Japanese application JP 58-128 182 describes a process in which the solution to be freed of mercury is filtered through activated carbon and carbon powder. DE 41 16 890 discloses a process for removal of mercury from waste streams, in which the solution to be freed of mercury is brought into contact with an adsorbing agent which contains an amalgamating metal on an activated carbon support having a BET surface area of 300 to 1000 $m^2/g$. The use of activated carbon having a specific surface area of at least 250 $m^2/g$ for the removal of mercury from liquids by adsorption is known from DE 26 43 478. The use of activated carbon settling filters for mercury removal from caustic soda, caustic potash or alkoxide solutions is technically customary, as described by Isfort, Chemie Anlagen und Verfahren ("CAV") [Chemical Plants and Processes], September 1972, pages 65-69. The comparatively simple activated carbon treatment does not lead, however, to satisfactory results in all cases. In particular, to achieve the desired low mercury values a very fine-grain powder of a high surface area activated carbon must be used. Especially in the filtration of alkoxide solutions, in which (in contrast to aqueous alkalis) very finely divided suspensions form due to secondary reactions with the alcohol or cleavage of the alkoxide, the activated carbon filters are very rapidly affected due to deposits of these suspensions, such that only an unsatisfactory service life of the filters is achieved, which makes activated carbon treatment economically unsatisfactory. As a remedy, DE 197 04 889 discloses a three-stage process for the demercurization of alkali metal alkoxide solutions, in which, in a first stage, the solution is led through inert fiber material in order to separate off the finely divided suspensions in this way and as a side effect to lower the mercury content by a factor of approximately 10. The solution is then filtered in a second stage through a customary activated carbon filter having a high-surface-area and finely divided activated carbon, which in turn lowers the mercury content by a factor of approximately 10. In a third stage, a distillative concentration of the alkoxide is carried out, i.e. by evaporation of the alcohol the solution is concentrated and thus the desired alkoxide concentration is established by the alkoxide solution being present in a distillation still and alcohol being distilled off through a packed column. In the course of this, the mercury concentration again falls by a factor of approximately 10. All in all, using the described process mercury contents of 28 to 50 ppb are achieved. Even using this entire process, the desired mercury content of at most 3 ppb, however, cannot be achieved.

In the known carbon filtration processes, the tendency of the high-surface-area active carbons to form very fine activated carbon powder, inter alia, is troublesome and leads to high pressure losses and low filter efficiencies. A further problem associated with customary activated carbon filtrations is the disposal of the activated carbon loaded with mercury. As a rule, the activated carbon has to be chemically treated for this, as a residue a mercury-containing active carbon suspension being obtained, which has to be disposed of.

The object of the present invention is therefore to find a simple and economically satisfactory process for carbon filtration, using which the mercury content in liquids, in particular in alkali solutions, but also in alkali metal alkoxide solutions, can be lowered. Accordingly, a process for the removal of mercury from solutions contaminated with mercury by filtration through a carbon filter has been found, which comprises using electrode graphite as carbon.

Surprisingly, it has been found that using the process according to the invention mercury can be depleted from solutions in a simpler and economically more satisfactory manner than using known processes. The process according to the invention is suitable, in particular, for the depletion of mercury in alkali solutions and also in alkali metal alkoxide solutions and can be combined with other purification processes or process steps in order to achieve higher grades of mercury depletion. A particular advantage of the process according to the invention is that electrode graphite loaded with mercury is regenerable in a simple manner, in contrast to activated carbons.

Preferably, the process according to the invention is employed for the removal of mercury from alkali solutions or alkali metal alkoxide solutions, in particular those alkali solutions or alkali metal alkoxide solutions which are produced by decomposition of alkali metal amalgam with water or alcohol. The preparation of alkali metal amalgam and its decomposition with water or alcohol, uncatalyzed or using catalysts, are known technologies. The alkalis employed are lithium, sodium, potassium, rubidium or cesium, preferably sodium or potassium. By decomposition of sodium or potassium amalgam with water, caustic soda or caustic potash is formed. By decomposition of sodium or potassium amalgam with alcohol, a solution of the corresponding sodium or potassium alkoxide in the corresponding alcohol is formed. The alkali or the alkoxide solution are in this case always, as described above, contaminated with mercury, which is completely or largely removed using the process according to the invention.

Any desired alcohol can be employed as an alcohol for the production of an alkali metal alkoxide solution to be treated using the process according to the invention. Preferably, a substituted or unsubstituted aliphatic, alicyclic, aromatic, arylaliphatic, arylalicyclic, cycloalkylaromatic or alkylaromatic alcohol is used. In particular, the straight-chain or branched aliphatic alcohols having one to 6 carbon atoms are used, such as methanol, ethanol, 1-propanol ("n-propanol"), 2-propanol ("isopropanol"), 1-butanol ("n-butanol"), 2-butanol ("isobutanol"), 2-methyl-1-propanol ("sec-butanol"), 1,1-dimethyl-1-ethanol ("tert-butanol"), or the individual isomeric C5- or C6-alcohols. The use of methanol or ethanol is particularly preferred.

By decomposition of sodium or potassium amalgam with methanol or ethanol, a solution of sodium methoxide or potassium methoxide in methanol or a solution of sodium ethoxide or potassium ethoxide in ethanol is produced, which is then subjected to the process according to the invention.

The concentration of the solution employed in the process according to the invention—i.e., for example the alkali solution or alkali metal alkoxide solution prepared by alkali metal amalgam decomposition with water or alcohol, can be varied in wide ranges; it is not crucial for the present invention.

Typically, in the purification of caustic soda or caustic potash, in general a concentration of at least 10% by weight, preferably at least 15% by weight, in a particularly preferred manner at least 20% by weight, and in general at most 70% by weight, preferably at most 65% by weight and in a particularly preferred manner at most 60% by weight of sodium hydroxide or potassium hydroxide in water is established. In the purification of sodium methoxide or potassium methoxide, in general a concentration of at least 20% by weight, in a preferred manner at least 25% by weight and in a particularly preferred manner at least 27% by weight, and in general at most 40% by weight, in a preferred manner at most 32% by weight and in a particularly preferred manner at most 31% by weight, of sodium methoxide or potassium methoxide in methanol is established. In the purification of sodium ethoxide or potassium ethoxide, in general a concentration of at least 10% by weight, in a preferred manner at least 15% by weight and in a particularly preferred manner at least 16% by weight, and in general at most 30% by weight, in a preferred manner at most 22% by weight and in a particularly preferred manner at most 20% by weight, of sodium ethoxide or potassium ethoxide in ethanol is established.

According to the invention, the solution to be freed of mercury is filtered through electrode graphite. Electrode graphite is a customary description for certain commercially available types of graphite which are customarily produced from petroleum residues such as "petroleum coke", by combustion at 800 to 1 300° C. and subsequent graphitization, customarily in a "Castner or Archeson furnace", in which by means of passing through electric current temperatures above 2000° C. are produced (cf., for example, the keyword "graphite" in: CD Römpp Chemie-Lexikon—Version 1.0, Georg Thieme Verlag Stuttgart/New York 1995 or the keyword "graphite", there in particular item "4.1.1 Manufacture", in Ullmann's Encyclopedia of Industrial Chemistry, 6th edition, 2000 Electronic Release, Wiley-VCH Verlag GmbH, Weinheim). Electrode graphite is used, for example, as electrode material or as a starting substance for the preparation of corrosion-resistant construction parts. Electrode graphite differs from activated carbons (cf. for this, for example, the keyword "activated carbon" in: CD Römpp Chemie-Lexikon—Version 1.0, Georg Thieme Verlag Stuttgart/New York 1995 or keyword "Carbon", there in particular item "5.Activated Carbon", in Ullmann's Encyclopedia of Industrial Chemistry, 6th edition, 2000 Electronic Release, Wiley-VCH Verlag GmbH, Weinheim) inter alia by a considerably lower BET surface area. In contrast to electrode graphite, activated carbon is a conglomerate which also contains very fine graphite-like particles, but which does not exhibit the typical stacked layer structure of actual graphite.

The electrode graphite to be used according to the invention has a BET surface area of in general at least $0.2$ $m^2/g$, preferably at least $0.5$ $m^2/g$, and in general at most $10$ $m^2/g$, preferably at most $5$ $m^2/g$. A preferred electrode graphite has a surface area of about $1$ $m^2/g$. The electrode graphite to be used according to the invention is employed in the form of particles having a mean particle size of in general at least 10 micrometers, preferably at least 20 micrometers, and at most 1000 micrometers, preferably at most 500 micrometers. The solution contaminated with mercury is filtered through a layer of such grains of electrode graphite of this type, which in general is at least 0.5 mm, preferably at least 1 mm and at most 30, preferably at most 10, mm thick. For this, any filter construction can be employed in which an appropriate carbon filter layer can be deposited, for example flat filters, disk filters, candle filters, plate filters, suction filters, edge filters or plastic cord filter candles. The use of edge filters is preferred, on which the carbon is deposited in the form of a suspension in the solvent used. This is well-known prior art.

Using the carbon filtration process according to the invention, a mercury depletion by the same factor as in known carbon filtration processes is typically achieved.

A particular advantage of the process according to the invention is the regenerability of the filter carbon. For the regeneration of the electrode graphite used, this is more conveniently mechanically loaded, i.e., for example, stirred. The use of ultrasound is very particularly simple. For this, the electrode graphite loaded with mercury, preferably in the form of a suspension in the solvent or the solution, from which mercury has been removed until the exhaustion of the filter carbon by means of the carbon filtration process according to the invention, is sonicated with ultrasound. The mercury deposits below here as a liquid phase according to the force of gravity. The carbon freed of mercury can then be deposited as a filter layer on a filter again. The sonication intensity, frequency and duration are set by means of the desired degree of regeneration of the carbon, i.e. in the final analysis according to economic considerations.

The carbon filtration process according to the invention can be combined with any other known mercury depletion process to give an overall process in order to combine the depleting action of the various process steps of the overall process, for example, the combination of the process according to the invention with a further process using which mercury is depleted by the factor 10, to give an overall depletion by a factor of approximately $10^3$, and the combination with two further processes, using which mercury can in each case be depleted by a factor of 10, to give an overall depletion by the factor $10^4$. The sequence of carrying out the individual process steps of the overall process can in principle be chosen freely. In general, it is advantageous firstly to carry out process steps which are mainly suitable for the removal of relatively large amounts of mercury, and finally to carry out fine purification processes. For example, it is advisable to carry out mechanical processes such as, for example, the coalescence of mercury droplets to give larger droplets before the carbon filtration process according to the invention.

The carbon filtration process according to the invention can also be combined, for example, with a process step for the distillative depletion of mercury by concentration of the solution. Furthermore, the distillation process according to the invention can be combined with a filtration step using fiber materials. Filtration processes of this type are also known.

It is likewise possible to carry out the filtration steps repeatedly or to combine them in any desired manner. For example, it is possible to filter repeatedly through carbon, repeatedly through fiber material, or repeatedly through carbon and fiber material. The actual design and sequence of individual filtration steps is a routine task for the person skilled in the art, who solves this according to the stream to be treated, its impurity content and the requirements for the depletion.

Using the process described, a very simple depletion of mercury is possible without the disadvantages of the known carbon filtration processes having to be accepted. In particular, the process according to the invention leads to high service lives of the carbon filters.

EXAMPLES

Example 1

An edge filter was coated with a 2 to 3 mm thick carbon layer by deposition of a suspension of electrode graphite (mean particle size 300 micrometers, BET surface area 1.1 m²/g) in methanol. At a temperature of 70-80° C., a mercury-loaded methanolic sodium methoxide solution (27% by weight) was filtered at a flow rate of 12-15 liters per 100 cm² filter area per hour.

Before and after filtration, 4 samples in each case were taken and analyzed for their mercury content. The results are shown in the following table.

| before filtration [ppm] | after filtration [ppm] |
|---|---|
| 23 | 3.3 |
| 21 | 4.3 |
| 18 | 3.3 |
| 17 | 3.1 |

Example 2

A carbon filtration was carried out using a 27% strength by weight sodium methoxide solution as in example 1. Before and after filtration, 5 samples in each case were taken and analyzed for their mercury content. The results are shown in the following table.

| before filtration [ppm] | after filtration [ppm] |
|---|---|
| 18 | 2.3 |
| 19 | 3.5 |
| 19 | 2.9 |
| 19 | 2.3 |
| >100 | 1.8 |

Example 3

A carbon filtration was carried out using a 27% strength by weight sodium methoxide solution as in example 1. Before and after filtration, and after distillation, 2 samples in each case were taken and analyzed for their mercury content. The results are shown in the following table.

| before filtration [ppm] | after filtration [ppm] |
|---|---|
| 10.8 | 3.6 |
| 13.8 | 4.2 |

The examples show that using the process according to the invention, despite use of a relatively coarse filter carbon, a good mercury depletion is achieved.

The invention claimed is:

1. A process for the removal of mercury from solutions contaminated with mercury present at least partially in metallic form, by filtration through a carbon filter, which comprises using electrode graphite having a mean particle size in the range from 20 to 1000 micrometers and a BET surface area in the range from 0.5 to 10 m²/g as carbon, wherein after the electrode graphite is loaded with mercury, the electrode graphite is regenerated by removing the mercury from the electrode graphite by sonication with ultrasound and then the regenerated electrode graphite is reused for mercury removal from solutions contaminated with mercury present at least partially in metallic form.

2. A process as claimed in claim 1, wherein the solution contaminated with mercury is filtered through a carbon layer having a thickness in the range from 0.5 mm to 30 mm.

3. A process as claimed in claim 1, wherein mercury is removed from an alkali liquor contaminated with mercury.

4. A process as claimed in claim 1, wherein mercury is removed from an alcoholic alkali metal alkoxide solution contaminated with mercury.

5. A process for the removal of mercury from solutions contaminated with mercury present at least partially in metallic form, by filtration through a carbon filter, which comprises using electrode graphite having a mean particle size in the range from 300 to 1000 micrometers and a BET surface area in the range from 0.5 to 10 $m^2/g$ as carbon, wherein after the electrode graphite is loaded with mercury, the electrode graphite is regenerated by removing the mercury from the electrode graphite by sonication with ultrasound and then the regenerated electrode graphite is reused for mercury removal from solutions contaminated with mercury present at least partially in metallic form.

6. A process as claimed in claim 5, wherein the solution contaminated with mercury is filtered through a carbon layer having a thickness in the range from 0.5 mm to 30 mm.

7. A process as claimed in claim 5, wherein mercury is removed from an alkali liquor contaminated with mercury.

8. A process as claimed in claim 5, wherein mercury is removed from an alcoholic alkali metal alkoxide solution contaminated with mercury.

\* \* \* \* \*